US010812600B1

(12) United States Patent
Naaman et al.

(10) Patent No.: US 10,812,600 B1
(45) Date of Patent: Oct. 20, 2020

(54) ENFORCING SESSION PROPERTIES COMPLIANCE FOR GATEWAY CONNECTED PUBLISH-SUBSCRIBE CLIENTS

(71) Applicant: International Business Machines Corporation, Armonk, NY (US)

(72) Inventors: Nir Naaman, Haifa (IL); Ira Rosen, Haifa (IL); Samuel Kallner, D.N. Menashe (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/698,995

(22) Filed: Nov. 28, 2019

(51) Int. Cl.
*H04L 29/08* (2006.01)
*H04L 29/06* (2006.01)
*H04W 88/16* (2009.01)

(52) U.S. Cl.
CPC .......... *H04L 67/142* (2013.01); *H04L 67/141* (2013.01); *H04L 67/26* (2013.01); *H04L 67/2809* (2013.01); *H04L 67/42* (2013.01); *H04L 69/163* (2013.01); *H04W 88/16* (2013.01)

(58) Field of Classification Search
CPC ..... H04L 67/141; H04L 67/142; H04L 67/26; H04L 67/2809; H04L 67/42; H04L 67/1095; H04L 67/10; H04L 67/38; H04L 69/163; H04L 12/1467; H04L 63/0807; H04L 63/08; H04L 63/101; H04L 65/1083; H04L 65/608; H04W 88/16; G06F 9/44

See application file for complete search history.

(56) References Cited

U.S. PATENT DOCUMENTS

| 9,269,080 | B2 | 2/2016 | Miller et al. |
| 9,614,914 | B2 | 4/2017 | Van De Poel et al. |
| 2002/0002688 | A1* | 1/2002 | Gregg ............... H04L 63/08 726/3 |

(Continued)

FOREIGN PATENT DOCUMENTS

CN 109088723 12/2018

OTHER PUBLICATIONS

Viel et al. "Internet of Things: Concepts, Architectures and Technologies," 13th IEEE International Conference on Industry Applications, 2018, pp. 909-916.

*Primary Examiner* — Le H Luu
(74) *Attorney, Agent, or Firm* — Roy S. Melzer (57) ABSTRACT

Methods, systems and computer products for ensuring session correctness for subscribing clients connected to a publish-subscribe broker via a gateway having intermittent connectivity with the broker. The gateway is configured to: (1) subscribe to one or more topics of a publish-subscribe service controlled by the broker in response to one or more subscription sessions initiated by one or more subscribing clients connected to the gateway for subscribing to the topic(s), (2) identify session parameters indicative of activity state of each subscription session, (3) reconnecting to the broker following a disconnection period, (4) receiving from the broker one or more messages published on the topic(s) during the disconnection period, the broker correlates each message with message properties, and (5) publish each message to one or more of the subscribing clients based on compliance of the message properties of the respective message with the session parameters of the respective subscription session.

14 Claims, 2 Drawing Sheets

(56) References Cited

U.S. PATENT DOCUMENTS

| | | | |
|---|---|---|---|
| 2004/0003046 A1* | 1/2004 | Grabelsky | H04L 65/608 709/206 |
| 2004/0059711 A1* | 3/2004 | Jandel | H04L 67/38 |
| 2008/0274762 A1* | 11/2008 | Wu | H04L 65/1083 455/518 |
| 2014/0280595 A1* | 9/2014 | Mani | H04L 67/10 709/204 |
| 2015/0304429 A1* | 10/2015 | Martens | H04L 67/141 709/202 |
| 2016/0119354 A1* | 4/2016 | Logue | H04L 63/0807 713/168 |
| 2017/0373863 A1* | 12/2017 | Mouafik | H04L 12/1467 |
| 2018/0167475 A1* | 6/2018 | Agarwal | H04L 63/101 |
| 2018/0307546 A1* | 10/2018 | Aston | G06F 9/44 |
| 2019/0205541 A1 | 7/2019 | Zimny et al. | |
| 2019/0222640 A1* | 7/2019 | Tock | H04L 67/42 |
| 2019/0335018 A1* | 10/2019 | Supramaniam | H04L 67/1095 |

\* cited by examiner

ENFORCING SESSION PROPERTIES COMPLIANCE FOR GATEWAY CONNECTED PUBLISH-SUBSCRIBE CLIENTS

BACKGROUND

The present invention, in some embodiments thereof, relates to a publish-subscribe service and, more particularly, but not exclusively, to enforcing session properties compliance for subscribing clients connected to a publish-subscribe service via a gateway having intermittent network connection with the publish-subscribe service.

Publish-subscribe is a popular communication paradigm allowing users that produce and consume messages to interact with each other in a decoupled fashion. A typical implementation of this paradigm is topic-based publish-subscribe in which the messages are classified according to topics. In the topic-based publish-subscribe, message producers, also called "publishers" (publishing clients), publish their messages on logical channels called "topics". Message consumers, also called "subscribers" (subscribing clients), subscribe to the topics that are of interest to them, and receive messages published on those topics of choice. Publishers and subscribers are decoupled because they don't need to know the network address of one another, only the topic identifier on top of which they communicate.

Due to its simple interface and inherent scalability, publish-subscribe is commonly used to support many-to-many communication in a wide variety of popular Internet applications, such as, for example, enterprise application integration, stock-market monitoring engines, RSS feeds, on-line gaming and/or the like. There are numerous implementations of the publish-subscribe middleware in both industry, for example, IBM® WebSphere Message Queue (IBM-WMQ), IBM® MessageSight (IBMMS), RabitMQ, Apache Kafka and academia, for example, Corona.

One publish-subscribe protocol in wide use may be, for example, the Message Queue Telemetry Transport (MQTT) used mainly for the "Internet of Things" (IoT) and Machine-to-Machine (M2M) applications. Another popular publish-subscribe protocol is the Java Messaging Service (JMS) which is used mainly for enterprise application integration and/or the like.

SUMMARY

According to a first aspect of the present invention there is provided a computer implemented method of ensuring correctness of sessions of subscribing clients connected to a publish-subscribe broker via a gateway having intermittent connectivity with the broker, comprising using one or more processors of the gateway which is intermittently connected to the broker for:

Subscribing to one or more topics of a publish-subscribe service controlled by the broker in response to one or more subscription sessions initiated by one or more subscribing clients connected to the gateway for subscribing to the one or more topics.

Identifying, for each subscription session, one or more session parameters indicative of activity state of the respective subscription session.

Reconnecting to the broker following a disconnection period during which the gateway was disconnected from the broker.

Receiving from the broker one or more messages published on the one or more topics during the disconnection period. The broker correlates each of the one or more messages with one or more message properties identified for the respective message.

Publishing one or more of the messages to one or more of the subscribing clients based on compliance of the one or more message properties of the respective message with the one or more session parameters of the respective subscription session.

According to a second aspect of the present invention there is provided a gateway connecting one or more subscribing clients to a broker controlling a publish-subscribe service, comprising a program store storing a code and one or more processor coupled to the program store and adapted to execute the code, the code comprising:

Code instructions to subscribe to one or more topics of a publish-subscribe service controlled by the broker in response to one or more subscription sessions initiated by one or more subscribing clients connected to the gateway for subscribing to the one or more topics.

Code instructions to identify, for each subscription session, one or more session parameters indicative of activity state of the respective subscription session.

Code instructions to reconnect to the broker following a disconnection period during which the gateway was disconnected from the broker.

Code instructions to receive from the broker one or more messages published on the one or more topics during the disconnection period. The broker correlates each of the one or more messages with one or more message properties identified for the respective message.

Code instructions to publish one or more of the messages to one or more of the subscribing clients based on compliance of the one or more message properties of the respective message with the one or more session parameters of the respective subscription session.

According to a third aspect of the present invention there is provided a computer program product for ensuring correctness of sessions of subscribing clients connected to a publish-subscribe broker via a gateway having intermittent connectivity with the broker, comprising:

A non-transitory computer readable storage medium;

First program instructions for subscribing to one or more topics of a publish-subscribe service controlled by the broker in response to one or more subscription sessions initiated by one or more subscribing clients connected to the gateway for subscribing to the one or more topics.

Second program instructions for identifying, for each subscription session, one or more session parameters indicative of activity state of the respective subscription session.

Third program instructions for reconnecting to the broker following a disconnection period during which the gateway was disconnected from the broker.

Fourth program instructions for receiving from the broker one or more messages published on the one or more topics during the disconnection period. The broker correlates each of the one or more messages with one or more message properties identified for the respective message.

Fifth program instructions for publishing one or more of the messages to one or more of the subscribing clients based on compliance of the one or more message properties of the respective message with the one or more session parameters of the respective subscription session.

Wherein the first, second, third, fourth and fifth program instructions are executed by one or more processors of the gateway from the non-transitory computer readable storage medium.

According to a fourth aspect of the present invention there is provided a computer implemented method of creating provisions for ensuring correctness of sessions of subscribing clients connected to a publish-subscribe broker via a gateway having intermittent connectivity with the broker, comprising using one or more processors of the broker to which the gateway is intermittently connected for:

Receiving a subscription request from the gateway for subscribing to one or more topics of a publish-subscribe service controlled by the broker. The gateway transmits the subscription request in response to one or more subscription session requests for subscribing to the one or more topics received from one or more subscribing clients connected to the gateway.

Correlating each message published on one or more of the topics with one or more message properties identified for the respective published message.

Transmitting to the gateway, after the gateway reconnects to the broker following a disconnection period during which the gateway was disconnected from the broker, each message published on one or more of the topics correlated with its one or more message properties.

Wherein the gateway publishes the respective message to one or more of the subscribing clients based on compliance of the one or more message properties of the respective message with one or more session parameters indicative of activity state of the respective subscription session.

According to a fifth aspect of the present invention there is provided a broker controlling a publish-subscribe service, comprising a program store storing a code and one or more processors coupled to the program store and adapted to execute the code, the code comprising:

Code instructions to receive a subscription request from the gateway for subscribing to one or more topics of a publish-subscribe service controlled by the broker. The gateway transmits the subscription request in response to one or more subscription session requests for subscribing to the one or more topics received from one or more subscribing clients connected to the gateway.

Code instructions to correlate each message published on one or more of the topics with one or more message properties identified for the respective published message.

Code instructions to transmit to the gateway, after the gateway reconnects to the broker following a disconnection period during which the gateway was disconnected from the broker, each message published on one or more of the topics correlated with its one or more message properties.

Wherein the gateway publishes the respective message to one or more of the subscribing clients based on compliance of the one or more message properties of the respective message with one or more session parameters indicative of activity state of the respective subscription session.

According to a sixth aspect of the present invention there is provided a computer program product for of creating provisions to ensure correctness of sessions of subscribing clients connected to a publish-subscribe broker via a gateway having intermittent connectivity with the broker, comprising:

a non-transitory computer readable storage medium.
first program instructions for receiving a subscription request from the gateway for subscribing to one or more topics of a publish-subscribe service controlled by the broker. The gateway transmits the subscription request in response to one or more subscription session requests for subscribing to the one or more topics received from one or more subscribing clients connected to the gateway.

second program instructions for correlating each message published on the one or more topic with one or more message property identified for the respective published message.

third program instructions for transmitting to the gateway, after the gateway reconnects to the broker following a disconnection period during which the gateway was disconnected from the broker, each message published on one or more of the topics correlated with its one or more message properties.

Wherein the gateway publishes the respective message to one or more of the subscribing clients based on compliance of the one or more message properties of the respective message with one or more session parameters indicative of activity state of the respective subscription session.

Wherein the first, second and third program instructions are executed by one or more processors of the broker from the non-transitory computer readable storage medium.

In a further implementation form of the first, second, third, fourth, fifth and/or sixth aspects, the session parameters comprising, for example, a session durability, a session start time, a session expiration period and/or the like. The session durability defines whether the respective subscription session is maintained when the respective subscribing client is disconnected from the gateway. The session start time indicates the timing of initiation of the respective subscription session. The session expiration period defines a session preservation time period while the respective subscribing client is disconnected from the gateway.

In a further implementation form of the first, second, third, fourth, fifth and/or sixth aspects, the gateway subscribes to the one or more topics in a durable subscription session defining an extended session expiration period.

In a further implementation form of the first, second, third, fourth, fifth and/or sixth aspects, the messages properties comprising, for example, a publish timestamp, a queueing duration, a queue length and/or the like. The publish timestamp indicating a publication time of the respective message on the respective topic. The queueing duration indicating the amount of time the respective message was held in a queue of the broker. The queue length indicates the number of messages that were already in the queue when the respective message was inserted into the queue.

In a further implementation form of the first, second, third, fourth, fifth and/or sixth aspects, one or more of the message properties are inserted into the respective message.

In an optional implementation form of the first, second, third, fourth, fifth and/or sixth aspects, one or more message properties are removed from one or more of the messages before publishing the respective message to one or more of the subscribing clients.

In a further implementation form of the first, second, third, fourth, fifth and/or sixth aspects, one or more of the message properties of one or more of the messages are included in one or more supplemental data elements received from the broker in association with the respective message.

In a further implementation form of the first, second, third, fourth, fifth and/or sixth aspects, one or more messages are correlated with their one or more message properties included in one or more of the supplemental data elements based on a predefined location of the respective supplemental data element(s) in a message queue created by the broker for preserving the one or more messages for transmission to the gateway.

In a further implementation form of the first, second, third, fourth, fifth and/or sixth aspects, the one or more message properties of one or more of the messages is correlated in one or more of the supplemental data elements with an index of the respective message to associate the respective message with its one or more message properties.

In a further implementation form of the first, second, third, fourth, fifth and/or sixth aspects, one or more of the supplemental data elements is published on one or more control topics to which the gateway is subscribed to receive the respective supplemental data element comprising one or more message properties of one or more of the messages.

In a further implementation form of the first, second, third, fourth, fifth and/or sixth aspects, the one or more message properties of one or more of the messages is correlated in one or more of the gateway and the broker apply one or more synchronization protocol to establish a timing reference with each other.

In a further implementation form of the first, second, third, fourth, fifth and/or sixth aspects, the publish-subscribe service is based on a Message Queue Telemetry Transport (MQTT) protocol.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a publish-subscribe service and, more particularly, but not exclusively, to enforcing session properties compliance for subscribing clients connected to a publish-subscribe service via a gateway having intermittent network connection with the publish-subscribe service.

A publish-subscribe service, platform and/or system may typically include a plurality of clients which may communicate with each other over one or more wired and/or wireless networks in a decoupled manner via one or more brokers, for example, a server, a network node, a cloud resource and/or the like configured to collect and dispatch messages.

The publish-subscribe service may be deployed for one or more applications, systems, platforms and/or infrastructures, for example, enterprise applications, IoT systems, M2M applications, organization infrastructure applications and/or the like and may employ one or more publish-subscribe protocols and/or middleware, for example, MQTT, AMQP, JMS, Apache Kafka, DDS, IBMWMQ, RabitMQ and/or the like. The publish-subscribe service may be typically deployed for monitoring and/or controlling and the clients may be therefore initiated by systems, devices and/or agents, for example, IoT devices, vehicular devices and/or the like as well as by infrastructure applications, for example, data collection applications, control and management applications, enterprise applications and/or the like.

Employing one or more of the publish-subscribe protocols, the clients may communicate with each other by publishing (posting) and subscribing (retrieving) to messages on the broker(s) of the publish-subscribe service.

The broker(s) may maintain a plurality of topics (message channels) each organizing (classifying and storing) messages sharing common properties in a respective message queue which may be accessible independently of other topics' message queues. Publishing clients (publishers) may therefore subscribe to post messages on one or more of the topics while subscribing clients (subscribers) may subscribe to one or more of these topics to receive messages of interest. The broker(s) controlling the service may forward (deliver) messages posted on each topic to the subscribing clients which are subscribed to the respective topic. The publishing clients and the subscribing clients are therefore completely decoupled from each other as they may be oblivious and unaware of each other's operational parameters, for example, protocol, mapping, addressing, timing and/or the like.

Naturally, the publish-subscribe service operation is simple and straight forward when all the clients are continuously connected to the broker. The broker may simply identify the active subscription sessions, i.e. subscriptions made by subscribing clients to one or more of the topics and may forward (deliver) messages published on these topics to the subscribing clients accordingly.

However, many of the applications, systems, platforms and/or infrastructures using the publish-subscribe service, for example, IoT applications and systems are characterized by one or more of the devices occasionally disconnecting of from the network. Such disconnections and reconnections may result from one or more reasons, for example, self-shutdown or communication interface turn off to preserve power, network failures, poor wireless network connection and/or the like.

The clients, in particular subscribing clients initiated by such disconnecting devices may therefore need to define their respective subscription sessions to instruct the broker how these subscription sessions should be maintained when the respective devices disconnect and/or reconnect to the broker (via the network). The broker may analyze the properties of each subscription session, for example, the subscription session state to identify whether the subscription session is active (alive) or not. Based on its activity state, the broker may manage the respective subscription session accordingly, in particular with respect to messages published on topic(s) to which the respective subscription session is subscribed, for example, preserve or dump messages published while the respective subscribing client is disconnected, forward or not preserved messages to the respective subscribing client when connected and/or reconnected and/or the like.

For example, when initiating a subscription session, each subscribing client may define the type of its respective subscription session(s) as durable or non-durable. A durable subscription session indicates that the respective subscription session is active (alive) even when the respective subscribing client disconnects from the broker. For durable subscription sessions, the broker may therefore preserve (store) messages published on the topic(s) subscribed by the durable subscription session and may forward the stored messages to the respective subscribing client when it reconnects to the broker. In contrast, the broker may dump (remove, delete) messages directed to non-durable subscription session(s) immediately on disconnection of the respective subscribing client from the broker.

Moreover, for one or more durable subscription sessions, a subscribing client may define a session expiration period indicating a certain time period during which the respective subscription session is active while the subscribing client is disconnected. As long as the session expiration period is not expired (from the time of disconnection) the respective subscription session is active (alive), however when the session expiration period expires, the respective subscription session is no longer active. Therefore, as long as the respective subscription session is alive, i.e. its session expiration period is not expired, the broker may preserve (store) the messages published on the topic(s) subscribed by the durable subscription session for transmission to the disconnected subscribing client when it reconnects. However, in case the session expiration period of the respective subscription session expires before the disconnected subscribing client reconnects, the broker may dump (remove, delete) the messages directed to the respective subscription session.

The subscribing clients may use one or more session parameters defined by the publish-subscribe protocol(s) to set and/or configure the subscription session type (durable, non-durable), the session expiration period and one or more additional session properties of one or more of the subscription sessions. For example, the MQTT version 3 protocol defines a CleanSession flag which the subscribing client may set in the initial CONNECT message to define the type of the subscription session. In another example, the MQTT version 5 protocol defines a SessionExpiry parameter which the subscribing client may set in the initial CONNECT message to define the session expiration parameter for the type of the subscription session.

It should be noted that while some embodiments of the present invention are described for the MQTT protocol, this should not be construed as limiting since the same teachings may be applied to other publish-subscribe services, protocols and/or middleware.

Many of the applications, systems, platforms and/or infrastructures utilizing the publish-subscribe service are large distributed systems which may be segmented geographically and/or hierarchically. The broker(s) may be therefore remote from the clients which may typically connect to the broker via one or more gateways, specifically an edge computing device, for example, a router, a wireless access point, a cellular base station, a server, a network node and/or the like deployed at the edge of the network in close network proximity to the clients.

Located at the network edge, in close network proximity to the clients, the publish-subscribe gateway may provide low latency, fast response, improved security and/or improved data privacy services to the its connected clients. Moreover, in order to improve efficiency of the publish-subscribe service and reduce network traffic exchanged between the gateway and the broker, the gateway may serve as a local broker to its connected clients and maintain a single link to the broker to serve all the subscription sessions initiated by its connected clients.

In such deployments, the gateway serving as the local broker may initiate a subscription session at the remote (global) broker in response to subscription session initiated by the locally connected clients at the local broker. Such deployments may be highly efficient and robust as long as there is a continuous network connection between the gateway and the remote broker. Since the gateway monitoring the activity state of the subscription sessions in real-time is constantly connected to the broker, it practically replicates the message queues controlled by the broker and may easily synchronize between the publishing timing of the messages and the activity state and timing of the local subscription sessions.

However, when the gateway is intermittently connected to the broker, such deployments may present major limitations in verifying and ensuring correctness and compliance of one or more the subscriptions sessions initiated by the clients connected to the broker via the gateway. The intermittent network connection between the gateway and the broker may be accidental, for example due to one or more network failures and/or deliberate, for example, the gateway operating in offline mode disconnected from the broker.

The failure to correctly enforce compliance of the subscription session properties may be traced to the inability of the gateway to replicate in real-time the message queues of the topics subscribed by its locally connected subscribing clients. The gateway acting as the local broker may therefore be unable to correlate in time the messages published on these topics with the activity state of the local subscription sessions. Moreover, in order to closely synchronize with the broker and locally update its message queues according to messages published at the broker, the gateway may typically subscribe at the broker with durable subscription session(s) having an extended (long) session expiration time. Maintaining the durable subscription of the session may force the broker to preserve (store) the messages directed to the gateway (clients) while the gateway disconnects from the broker and forward to the gateway these stored messages when the gateway reconnects.

During the disconnection period of the gateway from the broker, the activity state of one or more of its local subscription sessions may change. When the broker reconnects and receives the preserved messages, the gateway may fail to accurately correlate the messages with the active subscriptions and may erroneously forward one or more messages to one or more subscribing clients which should not receive these messages.

Enforcing the correctness and compliance of the subscription session properties may be unsurmountable due to inherent limitations in most if not all publish-subscribe protocols, specifically with respect to timing information and/or order information relating to the messages published (posted) on the topics of the publish-subscribe service.

According to some embodiments of the present invention, there are provided methods, systems and computer program products for enforcing the correctness and compliance of subscription session properties for subscribing clients connected to one or more brokers of the publish-subscribe service via the gateway which may be intermittently connected to the broker(s).

The broker may correlate each published message with one or more message properties, for example, a publish timestamp indicating the time of publication of the message at the (global) broker, a queueing duration indicative of the amount of time (period) that the message was held (i.e., stored, buffered) in the buffer and/or the queue of the (global) broker, a queue length indicative of the number of messages that were already in the queue when the (currently stored) message is inserted into the queue and/or the like.

Following reconnection of the gateway to the (global) broker after a disconnection period, the broker may forward the messages to the gateway the messages published on the topic(s) subscribed by the gateway during the disconnection period while the gateway was disconnected. Moreover, the broker forward the messages correlated with their message properties as recorded by the broker.

The broker may apply one or more methods, techniques, implementations and/or protocols for forwarding the message properties correlated with one or more of the delivered messages. For example, the broker may insert into one or more of the messages their respective message properties, for example, in one or more reserved fields, as metadata and/or the like. In another example, the broker may forward with the delivered messages one or more additional data elements mapping the message properties of one or more of the messages. In another example, the broker may publish the message properties of one or more of the delivered messages on one or more control topics to which the gateway is subscribed.

The gateway (local broker) receiving the messages correlated with their message properties may then identify the activity state of each local subscription session to determine whether the message(s) should be published (forwarded) to the subscribing client of the respective subscription session. For example, the gateway may identify that one or more active subscription sessions (durable and/or non-durable) are initiated by subscribing client(s) which were continuously connected to the gateway during the disconnection period. In such case the gateway may forward to this subscribing client(s) the messages published during the disconnection period. In another example, the gateway may identify that one or more active subscription sessions are durable sessions initiated by subscribing client(s) which are currently disconnected nut the session expiration period is not expired. In such case the gateway may preserve (locally store) these messages until the disconnected subscribing client(s) reconnect. In another example, the gateway may identify that one or more active subscription sessions are non-durable sessions initiated by subscribing client(s) which connected to the gateway after one or more of the messages (early messages) were queued at the (global) broker. In such case, the gateway may avoid delivering (forwarding) this early message(s) to the connected subscribing client(s).

The publish-subscribe service employing the gateway deployed to serve as the local broker for its locally connected clients may present major advantages and benefits compared to currently existing publish-subscribe services while ensuring compliance of the subscription sessions' properties for the local subscribing clients.

First, serving as the local broker and connecting to the (global) broker via a single subscription connection may significantly reduce the network traffic exchanged between the gateway and the broker compared to a plurality of independent subscription sessions initiated by the plurality of locally connected subscribing clients at the global broker via the gateway as may be done by the existing methods. Since each subscription session may include major overhead traffic for the control and management of the session, the combined overhead traffic of the plurality of subscription sessions may be significantly high. The single connection on the other hand may allow for maintaining a single or a limited number of subscription sessions compared to the number of local subscription sessions thus significantly reducing the volume of the exchanged network traffic.

Moreover, recording the message properties at the broker and forwarding them to the gateway (local broker) correlated with the messages published during the disconnection period may ensure that the subscription sessions initiated by the locally connected subscribing clients are managed correctly and fully comply with the subscription session parameters and properties defined by the local subscribing clients.

Furthermore, located at the network edge in close network proximity to the clients with a low latency and fast response connection to the clients, the gateway may provide additional services to the clients. For example, the gateway local broker may store-and-forward messages published by the local clients (publishers) by temporarily storing published messages while the gateway is disconnected from the broker and forwarding these stored messages once connectivity with the broker is restored.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
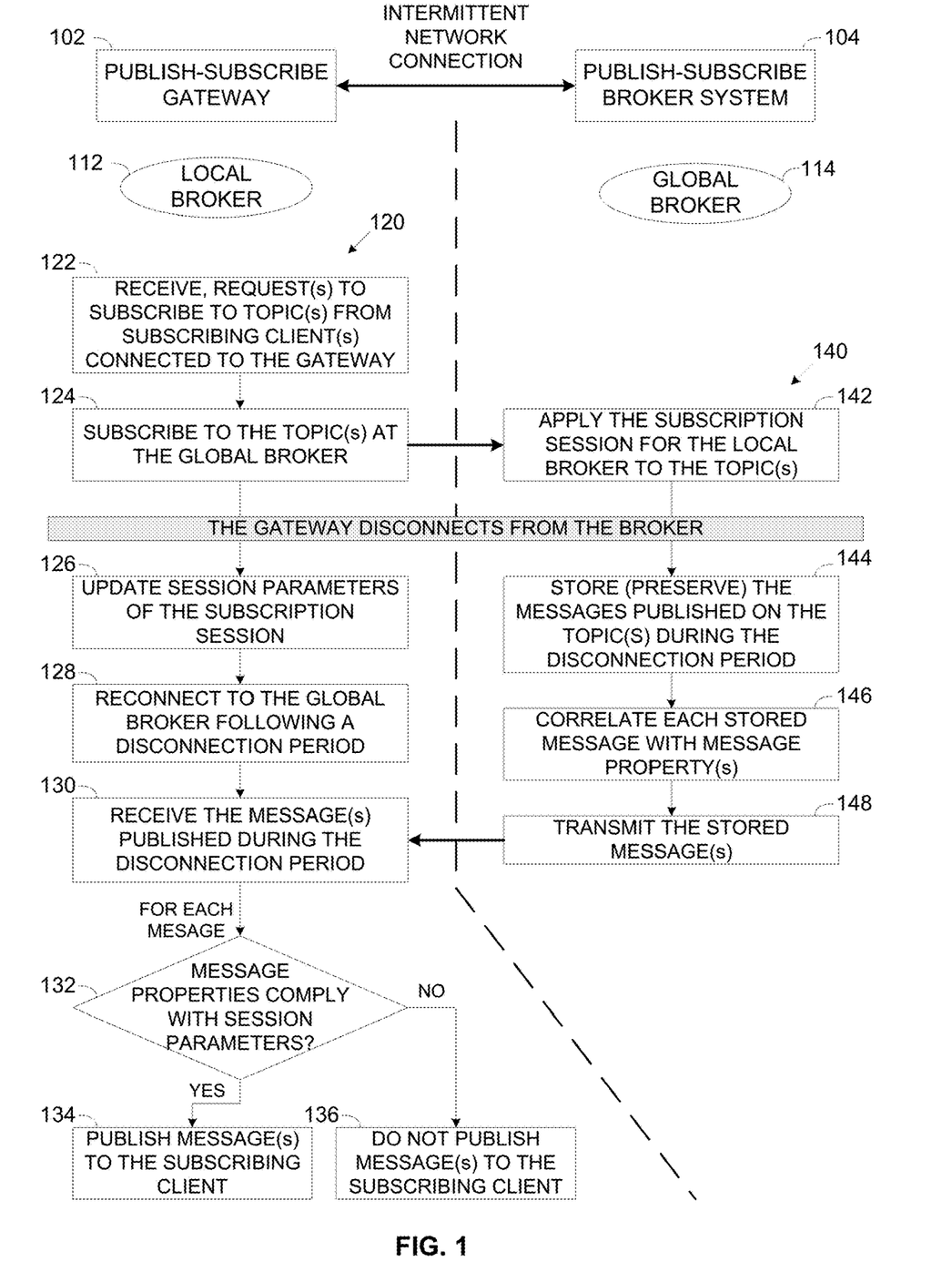
FIG. 1 presents flow charts of exemplary processes executed by a publish-subscribe gateway and a publish-subscribe broker for enforcing session properties compliance for subscribing clients connected to the broker via the gateway having intermittent network connection with the broker, according to some embodiments of the present invention.

Referring now to the drawings, FIG. 1 illustrates flow charts of exemplary processes executed by a publish-subscribe gateway and a publish-subscribe broker for enforcing session properties compliance for subscribing clients connected to the broker via the gateway having intermittent network connection with the broker, according to some embodiments of the present invention.

An exemplary process 120 may be executed by a publish-subscribe gateway 102 to enforce proper subscription sessions for one or more clients which are connected via the publish-subscribe gateway 102 to one or more publish-subscribe brokers (servers) 104 controlling a publish-subscribe service. An exemplary process 140 may be executed by the publish-subscribe broker 104 controlling the publish-subscribe service.

The subscribing client(s) may subscribe to one or more topics of the publish-subscribe service controlled by one or more of the publish-subscribe broker 104. As the subscribing client(s) are connected to the publish-subscribe broker(s) 104 via the publish-subscribe gateway 102, the publish-subscribe gateway 102 may serve as a local broker. Each of the subscribing client(s) may apply one or more session parameters for its subscription session to define the type of the session, an expiration timeout for the session in case of disconnection from the publish-subscribe gateway 102, types of messages to be published to it and/or the like.

However, there may be scenarios and deployments of the publish-subscribe service where the network connection between the publish-subscribe gateway 102 and one or more of the publish-subscribe broker(s) 104 is temporarily down. Such network connection loss may result for example, from unstable network connection susceptible to temporary connection failures resulting in an intermittent network connection between the publish-subscribe gateway 102 and the publish-subscribe broker(s) 104. In another example, the publish-subscribe gateway 102 may operate in offline mode for certain periods of time and deliberately disconnect from the publish-subscribe broker(s) 104. The publish-subscribe gateway 102 may go into offline operation mode for one or more reasons, for example, prevent interruptions by the publish-subscribe broker(s) 104 while performing critical tasks, power preservation among other.

The intermittent network connection may compromise the subscription session integrity and may lead to violation of the session parameter(s) defined by one or more of the subscribing client(s) for their respective subscription sessions.

Therefore, in order to enforce compliance of the subscription session of each subscribing client with the subscription session property(s) defined by the respective subscribing client for its subscription session, the publish-subscribe gateway 102, specifically a local broker 112 executed by the publish-subscribe gateway 102 may execute the process 120 in conjunction with the process 140 executed by a global broker 114 executed by the publish-subscribe broker 104.

Figure 2:
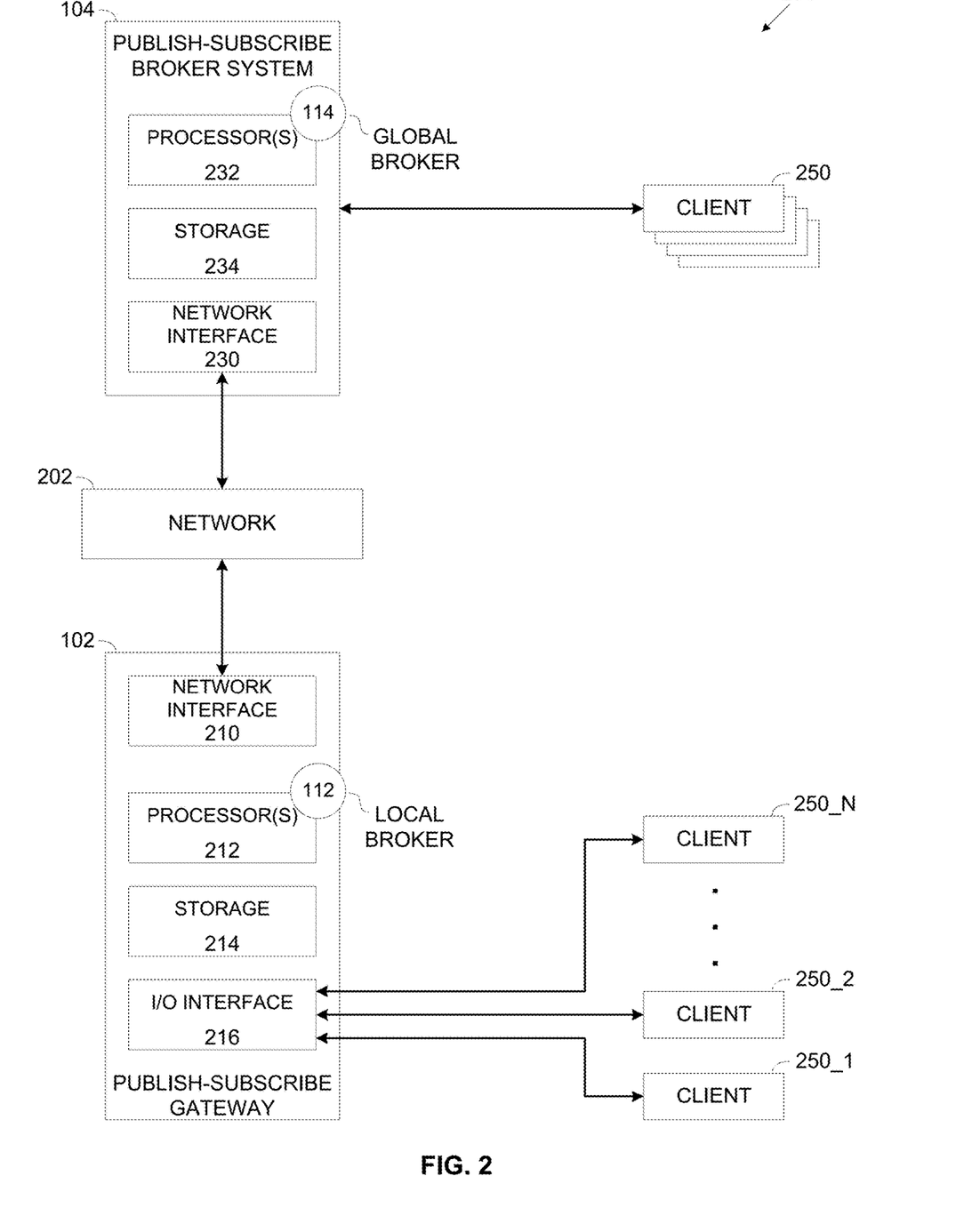
FIG. 2 is a schematic illustration of an exemplary system for enforcing publish-subscribe session properties compliance for subscribing clients connected a publish-subscribe broker via a publish-subscribe gateway having intermittent network connection with the broker, according to some embodiments of the present invention.

Reference is also made to FIG. 2, which is a schematic illustration of an exemplary system for enforcing publish-subscribe session properties compliance for subscribing clients connected a publish-subscribe broker via a publish-subscribe gateway having intermittent network connection with the broker, according to some embodiments of the present invention.

A publish-subscribe system 200 may include one or more publish-subscribe gateways 102 connected via a network 202 to one or more publish-subscribe brokers 104 providing and controlling the publish-subscribe service based on one or more publish-subscribe protocols and/or middleware, for example, MQTT, AMQP, JMS, Apache Kafka, DDS, IBM-WMQ, RabitMQ and/or the like.

The network 202 may include one or more wired and/or wireless networks, for example, a Local Area Network (LAN), a Wireless LAN (WLAN), a wide Area Network (WAN), a Municipal Area Network (MAN), a cellular network, the internet and/or the like.

For brevity, the system 200 is presented to include only a single publish-subscribe gateway 102 and a single publish-subscribe broker 104. This however should not be construed as limiting, since the system 200 may include a plurality of publish-subscribe gateways 102 and a plurality of publish-subscribe brokers 104 which may connect to each other via a plurality of network topologies and deployments.

The publish-subscribe broker 104, for example, a computer, a server, a computing node, a cluster of computing nodes and/or the like may include a network interface 230 for connecting to the network 202, a processor(s) 232 for executing the process 140 and a storage 234 for storing code (program store) and/or data.

The network interface 230 may include one or more wired and/or wireless network interfaces, for example, a LAN interface, a WLAN interface, a WAN interface, a cellular network interface and/or the like through which the publish-subscribe broker 104 may connect to the network 202.

The processor(s) 232 may include one or more processor(s), homogenous or heterogeneous, each comprising one or more processing nodes arranged for parallel processing, as clusters and/or as one or more multi-core processor(s). The processor(s) 232 may execute one or more software modules, for example, a process, an application, an agent, a utility, a tool, a script and/or the like each comprising a plurality of program instructions stored in a non-transitory medium such as the storage 234 and executed by one or more processors such as the processor(s) 232. The processor(s) 232 may further include and/or utilize one or more hardware components, for example, a circuit, an Integrated Circuit (IC), an Application Specific Integrated Circuit (ASIC), a Field Programmable Gate Array (FPGA), a Digital Signals Processor (DSP), a network processor and/or the like to support execution of the process 140.

The storage 224 used for storing data and/or code (program store) may include one or more non-transitory memory devices, either persistent non-volatile devices, for example, a hard drive, a solid state drive (SSD), a magnetic disk, a Flash array, A Read Only Memory (ROM) and/or the like. The storage 214 may also include one or more volatile devices, for example, a Random Access Memory (RAM) device, a cache memory and/or the like. The storage 234 may further comprise one or more network storage resources, for example, a storage server, a Network Attached Storage (NAS), a network drive, and/or the like accessible via the network interface 230.

The processor(s) 232 may therefore execute one or more functional modules which may be implemented by one or more of the software modules, one or more of the hardware components and/or a combination thereof, for example, the global broker 114 for providing and/or controlling the publish-subscribe service and/or part thereof.

Optionally, the publish-subscribe broker 104 and/or the global broker 114 are provided by one or more cloud computing services, for example, Infrastructure as a Service (IaaS), Platform as a Service (PaaS), Software as a Service (SaaS) and/or the like provided by one or more cloud infrastructures, platforms and/or services such as, for example, IBM Cloud, Amazon Web Service (AWS), Google Cloud, Microsoft Azure and/or the like.

A plurality of clients 250 may connect to the publish-subscribe broker 104 for publishing and/or subscribing for one or more topics (messaging channels) of the publish-subscribe service to send and/or receive respectively data via these topics. A publishing client 250 may publish (post) one or more messages on one or more of the topics while a subscribing client 250 may subscribe to consume one or more messages posted on one or more of the topics.

The clients 250 may be initiated by one or more devices, for example, an IoT device (e.g. sensor, controller, etc.), a smart device, a vehicular device and/or the like. The clients 250 may be also initiated by one or more applications, systems, platforms and/or the like, for example, enterprise applications, IoT systems, M2M applications, organization infrastructure applications and/or the like which may subscribe (consume) and/or publish data via the publish-subscribe service. Each device may typically initiate a client 250, however one or more devices and/or applications may potentially initiate multiple clients 250 and may further apply parallel and/or shared subscriptions by initiating multiple clients 250 subscribed to a common topic.

When initiating a subscription session for subscribing to a topic of the publish-subscribe service, each subscribing client 250 may define one or more session parameters for the subscription session. The session parameters may define the type and/or state of the subscription session and a policy which should be applied by the publish-subscribe broker 104 (i.e., the global broker 114) accordingly for maintaining the subscription session of the respective subscribing client 250 and for publishing to the respective subscribing client 250 messages published on the respective topic.

As known in the art, the session parameters are typically defined by the publish-subscribe protocol(s) employed by the subscribing clients 250 and may be further negotiated with the global broker 114 according to the publish-subscribe protocol(s) supported by the publish-subscribe broker 104.

For example, the session parameters may define activity state of the subscription session, i.e., whether the subscription session is alive or not. Naturally, when the subscribing client 250 is connected to the publish-subscribe broker 104, its respective subscription session(s) are alive. However, the activity state session parameter(s) may define that the subscription session should be treated as live when the respective subscribing client 250 disconnects and reconnects to the publish-subscribe broker 104 due to one or more reasons, for example, client device power down (e.g. power preservation), network failure, communication failure and/or the like. The activity state session parameter(s) of the subscription session may therefore indicate whether the publish-subscribe broker 104 should be maintain or remove the subscription session when the subscribing client 250 disconnects and reconnects to the publish-subscribe broker 104. In particular, the active state session parameter(s) may define what should be done with messages relating to the subscription session of the respective subscribing client 250 (i.e. posted on the subscribed topic(s)) which are published while the subscribing client 250 is disconnected.

For example, as known in the art, the session parameters may include a durability parameter defining whether the subscription session is durable or not. In case the subscription session of one or more subscribing clients 250 is defined as durable, the global broker 114 should maintain the subscription session of the respective subscribing client 250 while the respective subscribing client 250 is disconnected from the publish-subscribe broker 104. In such case, the global broker 114 should preserve message(s) published on the subscribed topic(s) and publish the preserved message(s) to the respective subscribing client 250 when it reconnects to the publish-subscribe broker 104. However, in case the subscription session of one or more subscribing clients 250 is defined as non-durable, the global broker 114 should remove the subscription session of the respective subscribing client 250 when the respective subscribing client 250 disconnects from the publish-subscribe broker 104. In such case, the global broker 114 should not preserve (i.e., remove) the message(s) published on the subscribed topic(s) for publication to the respective subscribing client 250 and should not publish these message(s) to the respective subscribing client 250 when it reconnects to the publish-subscribe broker 104.

The session parameters may further include a session start time indicating the timing of initiation of the respective subscription session, i.e. the time of connection of the respective subscribing client 250 to the publish-subscribe broker 104.

The session parameters may also include a session expiration period defining a session preservation time period while the respective subscribing client 250 is disconnected from the publish-subscribe gateway 102. The global broker 114 should preserve (maintain) the subscription session of the respective subscribing client 250 as an active (live) session while the respective subscribing client 250 is disconnected from the publish-subscribe broker 104 until expiration of the session expiration period. In case the respective subscribing client 250 reconnects to the publish-subscribe broker 104 before the session expiration period expires, the global broker 114 manages the subscription session from the point it was stopped when the respective subscribing client 250 disconnected. However, in case the respective subscribing client 250 reconnects to the publish-subscribe broker 104 after the session expiration period expires, the global broker 114 may create a new subscription session for the respective subscribing client 250 and manage the subscription session as if it is the first time the respective subscribing client 250 connects to the publish-subscribe broker 104, i.e., with no history.

The session expiration period may be typically set by one or more of the subscribing clients 250 in conjunction with the durability parameter, in particular, the subscribing client 250 may set the session expiration period for subscription sessions defined as durable.

The session parameters, for example, the durability parameter, the session expiration period and/or the like may be implemented in a plurality of methods and techniques. Moreover, the session parameters are typically defined by each publish-subscribe protocol as known in the art. The following examples are presented for the MQTT publish-subscribe protocol which is highly common for IoT applications, systems and platforms. However, this should not be construed as limiting, since publish-subscribe protocol(s) may be applied by the clients 250 and/or the publish-subscribe broker 104 which may define other implementations of one or more of the session parameters.

For example, the MQTT specification version 3 defines a CleanSession flag (which may be used as the durability parameter) that the subscribing client 250 must set to either true (1) or false (0) in the initial CONNECT message the subscribing client 250 sends to the publish-subscribe broker 104, specifically an MQTT broker. If the CleanSession flag is set to true, it means that when the subscribing client 250 disconnects from the MQTT broker 104 (for whatever reason) all its records in the MQTT broker 104, including queued messages and subscriptions, are deleted. This means that when the subscribing client 250 reconnects to the MQTT broker 104, the subscription session starts as if this was the first time the subscribing client 250 connects to the MQTT broker 104, i.e., it starts clean. If the CleanSession flag is set to false, it means that when the subscribing client 250 disconnects from the MQTT broker 104 its persistent records in the MQTT broker 104 are preserved. Persistent records that are maintained as part of the subscription session may include queued messages (with Quality of Service 1 and 2) and subscriptions. This means that when a subscribing client 250 connected with CleanSession false disconnects the MQTT broker 104, the global broker 114 maintains the subscriptions of the disconnected subscribing client 250 and continues to accumulate new published messages that match the subscriptions. When the subscribing client 250 reconnects, the MQTT broker 104 automatically restores the subscription(s) of the subscribing client 250 and publishes to the subscribing client 250 any message published on this subscription(s) including message(s) that was buffered while the subscribing client 250 was disconnected.

In another example, for the MQTT protocol, the global broker may log the time of reception of the initial CONNECT message from a subscribing client 250 to set the session start time parameter.

In another example, the MQTT specification version 5 defines a CleanStart flag which is similar to the CleanSession flag defined by MQTT specification version 3. The MQTT specification version 5 further defines a SessionExpiry parameter which may be set in the CONNECT message the subscribing client 250 sends to the publish-subscribe broker 104, specifically the MQTT broker 104. The SessionExpiry parameter serving as the session expiration parameter may be set by the subscribing client 250 in conjunction with CleanStart false, to define the time interval that the MQTT broker 104 should maintain the subscription session of the respective subscribing client 250 after the respective subscribing client 250 disconnects from the MQTT broker 104. The MQTT specification version 5 further extends the ability of the subscribing clients 250 to modify the session parameters in the DISCONNECT message when the subscribing client 250 gracefully disconnects from the MQTT broker 104.

As seen in the system 200, some of the clients 250, for example, client 250_1, client 250_2 through client 250_N may connect to the publish-subscribe broker 104 via the publish-subscribe gateway 102, for example, a computer, a server, a router, an access point, a computing node, a cluster of computing nodes and/or the like. In particular, the publish-subscribe gateway 102 may be an edge computing device deployed at the edge of the network 202 in close network proximity to one or more of the clients 250, specifically the clients 250_1 through 250_N. This deployment is highly typical to many publish-subscribe systems in which the publish-subscribe broker 104 may be geographically and/or hierarchically remote from the clients 250 and one or more publish-subscribe gateway 102 may be deployed at the network edge to serve end devices, i.e. the clients 250.

Located at the network edge, in close network proximity to the clients 250, the publish-subscribe gateway 102 may provide low latency, fast response, improved security and/or improved data privacy to the clients 250 connected to it. The publish-subscribe gateway 102 may therefore serve as an efficient local broker for the clients 250 connected to it.

The publish-subscribe gateway 102 may maintain a single connection to the publish-subscribe broker 104 for serving the plurality of clients 250 connected to it. As local broker, the publish-subscribe gateway 102 subscribe to one or more topics at the publish-subscribe broker 104 on behalf of the clients 250 connected to the publish-subscribe gateway 102. In response to a session subscription requests received from its connected subscribing clients 250, the publish-subscribe gateway 102 may forward these subscriptions to the publish-subscribe broker 104 via the single connection. When messages on these subscriptions (topics) posted, the publish-subscribe broker 104 may forward these posted messages to the publish-subscribe gateway 102 via the single connection and the publish-subscribe gateway 102 may publish (forward) these messages to the respective subscribing clients 250 subscribed to these topic(s).

This single connection data transfer may significantly reduce the volume of the traffic exchanged between the publish-subscribe gateway 102 and the publish-subscribe broker 104 since the need for the clients 250 to maintain multiple separate connections each adding significant overhead traffic is eliminated. Moreover, the publish-subscribe gateway 102 serving as the local broker may locally process and manage at least some of the messages published and/or subscribed on topic(s) common to multiple clients 250 connected to the publish-subscribe gateway 102. This may eliminate the need to transfer at least some of these locally managed messages to/from the publish-subscribe broker 104 thus further reducing the volume of the exchanged traffic.

The publish-subscribe gateway 102 may provide additional services to the clients 250, for example, provide store-and-forward services which means that the publish-subscribe gateway 102 temporarily stores messages while it is disconnected from the publish-subscribe broker 104 and forwards these stored messages once connectivity with the publish-subscribe broker 104 is restored.

The publish-subscribe gateway 102 may include a network interface 210 such as the network interface 230 for connecting to the network 202, a processor(s) 212 such as the processor(s) 232 for executing the process 120 and a storage 214 such as the storage 234 for storing code (program store) and/or data.

The publish-subscribe gateway 102 may further include an Input/Output interface 216 for connecting to one or more of the clients 250, specifically the clients 250_1 through 250_N. the I/O interface 216 may include one or more wired and/or wireless interfaces, for example, a Controller Area Network (CAN) interface, a Universal Serial Bus (USB) interface, a serial interface, a Radio Frequency (RF) interface, a Bluetooth interface, a WLAN interface (e.g. Wi-Fi) and/or the like configured to enable communication with one or more of the clients 250. Optionally, the I/O interface 216 is integrated with the network interface 210.

The processor(s) 212 may include one or more processor(s), homogenous or heterogeneous, each comprising one or more processing nodes arranged for parallel processing, as clusters and/or as one or more multi-core processor(s). The processor(s) 232 may execute one or more software modules, for example, a process, an application, an agent, a utility, a tool, a script and/or the like each comprising a plurality of program instructions stored in a non-transitory medium such as the storage 214 and executed by one or more processors such as the processor(s) 212. The processor(s) 212 may further include and/or utilize one or more hardware components, for example, a circuit, an IC, an ASIC, an FPGA, a DSP, a network processor and/or the like to support execution of the process 120.

The processor(s) 212 may therefore execute one or more functional modules which may be implemented by one or more of the software modules, one or more of the hardware components and/or a combination thereof, for example, the local broker 112 for serving at least some of the clients 250 (e.g. 205_1 through 250_N) and further enforcing compliance of the subscription session for one or more of these clients 250.

In order to serve as the as local broker for the clients connected to the publish-subscribe gateways 102, the local broker 112 needs to be highly synchronized with the global broker 114 with respect to the active local subscriptions of the subscribing clients 250 connected to the publish-subscribe gateway 102 and the published messages corresponding to these active subscriptions. Since the local broker 112 maintains only the single connection with the global broker 114 to serve multiple subscribing clients 250, the broker may initiate, at the global broker 114, durable subscription sessions with an extended session expiration period to serve the local subscription sessions of the subscribing clients 250.

The local broker 112 may therefore initiate durable subscription sessions regardless of whether specific subscribing clients 250 (connected to the gateway 102) initiated respective non-durable local subscription sessions. As long as the network connection between the publish-subscribe gateways 102 and the publish-subscribe broker 104 is stable and continuous, the durable subscription session of the local broker 112 at the global broker 114 vs. the non-durable local subscription sessions may present no issues since the local broker may keep track the local active subscription sessions and publish the respective messages accordingly to the respective subscribing client(s) 250.

However, publish-subscribe service deployments such as the system 200 may experience intermittent network connection between the publish-subscribe gateway 102 and the publish-subscribe broker 104 leading to occasional disconnection of the publish-subscribe gateway 102 from the publish-subscribe broker 104 due to, for example, unstable network(s), poor wireless network(s) coverage, the publish-subscribe gateway 102 operating in disconnected (offline) mode, and/or the like. The intermittent network connection coupled with the durable subscription sessions vs. non-durable local subscription sessions may lead to incompliance of the local broker 112 with the publish-subscribe protocol which may result in discrepancies and/or inconsistencies in serving the subscribing client devices 250 subscribed to the local broker 112 via the local subscription sessions.

For example, following a disconnection of the publish-subscribe gateway 102 from the publish-subscribe broker 104, one or more of the subscribing clients 250 subscribed to the local broker 112 with a non-durable or and/or expired local subscription session may erroneously receive messages they should have not receive. This failure may be demonstrated by the following sequence:

The local broker 112 connects to the global broker 114 with a durable subscription session, in particular a durable subscription session with an extended session expiration period P1. For example, in case of the MQTT version 3 protocol, the local broker 112 connects to the global broker 114 with the CleanSession flag set to false (0).

A certain subscribing client C1 subscribes to a certain topic T1 at the local broker 112 with a non-durable subscription session or with a durable subscription session with a session expiration period P2 shorter than P1. For example, in case of the MQTT version 3 protocol, the subscribing client C1 connects to the local broker 112 with the CleanSession flag set to true (1).

The local broker 112 forwards the subscription to the global broker 114.

The publish-subscribe gateway 102 disconnects from the publish-subscribe broker 104.

The subscribing client C1 disconnects from the publish-subscribe gateway 102.

Messages are published on the topic T1 at the global broker 114. Since the local broker 112 is subscribed at the global broker 114 with a durable subscription session, the global broker 114 buffers (stores) these messages for transmission to local broker 112 when the publish-subscribe gateway 102 reconnects to the publish-subscribe broker 104.

After a time period which is shorter than P1 and longer than P2 (if applicable), the subscribing client C1 reconnects to the publish-subscribe gateway 102 and subscribes to T1 at the local broker 112. The subscribing client C1 may not receive messages since the publish-subscribe gateway 102 is disconnected from the publish-subscribe broker 104.

The publish-subscribe gateway 102 reconnects to the publish-subscribe broker 104 before expiration of P1 and the local broker 112 reestablishes its durable subscription session at the global broker 114 (the subscription session is maintained since P1 is not expired).

The global broker 114 publishes (forwards) the buffered messages published on T1 to the local broker 112 which publishes (forwards) these messages to the subscribing client C1.

The subscribing client C1 receives the buffered messages. As evident, according to the publish-subscribe protocol, the subscribing client C1 should not receive these buffered messages since they were published while the subscribing client C1 was disconnected and its subscription session was not active (i.e. not durable or durable with expired session expiration period). It should be noted that in case of stable and continuous connection between the publish-subscribe gateway 102 reconnects to the publish-subscribe broker 104, the local broker monitoring the connection of the subscribing client C1 with respect to the time of arrival of the messages would not publish these messages to the subscribing client C1.

Such protocol compliance failures may not be easy to overcome due to inherent limitations in most if not all publish-subscribe protocols, specifically with respect to timing information and/or order information relating to the messages published (posted) on the topics of the publish-subscribe service.

The local broker 112 may therefore execute the process 120 to ensure compliance with the publish-subscribe protocol and correctness of the local subscription sessions by publishing only messages that comply with the session parameters of the local subscription sessions of the subscribing clients 250 connected to the publish-subscribe gateway 102. The local broker 112 may ensure compliance of the messages based on additional data, specifically message properties provided by the global broker 114. The global broker 114 may execute the process 140 to create provisions to enable the local broker to ensure correctness of the local subscription sessions by identifying one or more of the message properties for each message published on topic(s) corresponding to the local broker 112, associating each of these messages with its message property(s) and publishing (forwarding) these messages associated with their message properties to the local broker 112.

As shown at 122, the process 120 starts with the local broker 112 receiving one or more subscription session requests from one or more subscribing clients 250 connected to the publish-subscribe gateway 102 for subscribing to one or more topics of the publish-subscribe service managed and controlled by the global broker 114 executed by the publish-subscribe broker 104.

The local broker 112 may monitor each local subscription session to identify their session parameters in order to determine which of the local subscription sessions are active (alive). The active (live) local subscription sessions may include subscription sessions initiated by subscribing clients 250 which are currently (still) connected to the local broker 112. However, the active local subscription sessions may further include durable subscription sessions which were initiated by subscribing clients 250 which are not currently connected to the local broker 112 but their session expiration period has not yet expired.

The local broker 112 may identify one or more of the session parameters for one or more of the local subscription sessions by monitoring the local subscription sessions. For example, monitoring the subscription session requests, the local broker 112 may detect a session start time indicating the timing of initiation of one or more subscription sessions as recorded by the local broker 112 at the time of receiving the subscription session request from the subscribing client (s) 250. The local broker 112 may further extract one or more of the session parameters from the request initially received from one or more subscribing clients 250 to initiate one or more of the subscription sessions. For example, as described for the MQTT protocol, the local broker 112 may extract the session parameters, for example, the durability parameter (CleanSession flag) and/or the session expiration period from the CONNECT message transmitted by the subscribing client 250 to initiate a subscription session.

The local broker 112 may further maintain one or more subscription lists, for example, a table, a database and/or the like to list the currently active (live) local subscription session, i.e., in active state based on the session parameters identified for each of the local subscription sessions. Moreover, the local broker 112 may maintain a plurality of lists of active local subscription sessions where each list is associated with a respective one of the topics subscribed by the local subscription sessions.

As shown at 124, the local broker 112 may forward the local subscription session(s) by subscribing to the respective topic(s) at the global broker 114. In particular, the local broker 112 subscribes to the topic(s) at the global broker 114 with a durable session expiration period, for example, hours, days, etc.

As shown 142, the global broker 114 receives the subscription session request from the local broker 112 and applies the subscription session to the respective topic(s) for the local broker 112 such that the local broker 112 is subscribed to the topic(s) at the global broker 114.

While the network connection between the publish-subscribe gateway 102 and the publish-subscribe broker 104 is stable, the local broker 112 may receive from the global broker 114 one or more messages published on the respective topic(s) at the global broker 114. The local broker may then publish (forward) these messages to the subscribing client(s) connected to the publish-subscribe gateway 102 and subscribed to these topic(s).

However, due to intermittent network connection between the publish-subscribe gateway 102 and the publish-subscribe broker 104, the local broker 112 may disconnect from the global broker 114.

As shown at 126, during a disconnection period while the local broker 112 is disconnected from the global broker 114, the local broker 112 may monitor each local subscription session and may update the session parameters of one or more of the local subscription session following changes in the active (live) state of the respective subscription session(s). The changes in the active state may result, for example, from disconnection of one or more subscribing clients 250 from the local broker 112 which may cause the respective local subscription session(s) to become inactive, in particular in case the local subscription session(s) are non-durable. In another example, the changes in the active state may result from reconnection of one or more subscribing clients 250 to the local broker 112 which may affect the session start time of the respective local subscription session(s). Moreover, one or more reconnecting subscribing clients 250 may reconnect with adjusted and/or new session parameters, for example, the durability parameters, the session expiration period and/or the like. In another example, the changes in the active state may result from expiration of the session expiration period of one or more of the local subscription sessions which may thus become inactive sessions.

The local broker 112 may further update the subscription list(s) to reflect the changes detected for one or more of the active (live) local subscriptions.

As shown at 144, since the local broker 112 is subscribed at the global broker 114 with a durable subscription session, during the disconnection period while the local broker 112 is disconnected from the global broker, the global broker 114 may locally store (preserve) one or more messages published (posted) on the topic(s) to which the local broker 112 is subscribed.

For example, the global broker 114 may push the messages published (posted) on the topic(s) to which the local broker 112 is subscribed into a buffering and/or a queue where they may be stored until connection with the local broker 112 is reestablished.

As shown at 146, the global broker 114 may correlate each message published on any of the topics of the publish-subscribe service (at the global broker 114) with one or more message properties. In particular, the global broker 114 assign the message property(s) to messages posted (published) on topics to which the local broker 112 is subscribed, for example, the messages stored in the buffer and/or the queue.

The message properties may include, for example, a publish timestamp indicating the time of publication of the message at the global broker 114 by a publishing client 250. In another example, the message properties may include a queueing duration indicating the amount of time (period) that the message was held (i.e., stored, buffered) in the buffer and/or the queue of the global broker 114. In another example, the message properties may include a queue length which may indicate the number of messages that were already in the queue when the (currently stored) message was inserted into the queue. In other words, the queue length may serve as an incrementing index of the message such that the identity, the order and/or the number of messages stored in the buffer (queue) and/or retrieved from the buffer (queue), in particular retrieved for transmission to the local broker 112.

The global broker 114 may correlate each message with its message properties using one or more methods, techniques and/or implementations.

For example, the global broker 114 may insert one or more of the message properties of the respective message into the respective message itself. For example, the global broker 114 may insert one or more of the message properties as metadata in fields and/or segments of the respective message reserved for metadata. In another example, the global broker 114 may insert one or more of the message properties in one or more fields and/or segments of the respective message which are reserved by the respective publish-subscribe protocol used by the local broker 112.

In another example, the global broker 114 may include one or more of the message properties of one or more messages in one or more supplemental data elements inserted into the buffer and/or queue storing the messages, in particular, the global broker 114 may insert the supplemental data element(s) in association with respective stored messages. The global broker 114 may apply one or more methods, techniques and/or protocols to correlate one or more of the messages with their respective message properties.

For example, one or more of the messages may be correlated with the supplemental data element(s) comprising their message property(s) based on a predefined location of the at least one supplemental data element in the buffer and/or queue of the global broker 114 which may translate to a predefined location in message queue of the messages transmitted to the local broker (after the network connection is reestablished). For example, the global broker 114 may insert the publish timestamp, the queueing duration and/or the queue length of one or more messages into the buffer immediately following the respective message. When transmitting message queue of stored messages to the local broker 112, the global broker 114 may also transmit the supplemental data element(s) in the order set in the queue to correlate them with their respective messages.

In another example, one or more of the supplemental data elements may include the message properties of multiple messages and use an index of each message to correlate the respective message with its message property(s). There may be, for example, a single supplemental data element which correlates all queued (stored) messages based on their indexes and is inserted at the beginning of the message queue. In another example, there multiple indexing based supplemental data elements may be inserted in the message queue every predefined number of messages, for example, 10, 100 and/or the like. In another example, the multiple indexing based supplemental data elements may be inserted in the message queue every predefined period of time, for example, 60, 600 seconds and/or the like.

In another example, one or more supplemental data elements correlating message properties with one or more of the queued messages may be published and stored by the global broker on one or more control topics to which the local broker 112 may subscribe to receive the supplemental data elements. In particular, the message properties included in such supplemental data elements may be correlated with their respective message based on the indexes of the respective messages.

As shown at 128, following reconnection of the publish-subscribe gateway 102 to the publish-subscribe broker 104 and assuming the extended session period is not expired, the local broker 112 may reconnect and reestablish its durable subscription session with the global broker 114.

As shown at 148, after the local broker 112 is reconnected, the global broker 114 may transmit to the local broker 112 all the messages which were published during the disconnection period on the topic(s) to which the local broker 112 is subscribed and which were therefore stored by the global broker 114, for example, in the buffer, in the queue and/or the like.

As shown at 130, the local broker 112 receives the messages which were published during the disconnection period on the topic(s) to which the local broker 112 is subscribed on behalf of one or more of the subscribing clients 250 connected to the publish-subscribe gateway 102.

As shown at 132, which is a conditional step, for each message which was published on a certain topic during the disconnection period and received from the global broker 114, the local broker 112 checks compliance of the message property(s) of the respective message with the session parameter(s) of each local subscription session subscribed to the certain topic. In case the message property(s) of the respective message comply with the session parameter(s) of the respective subscription session the process may branch to 134, otherwise in case of non-compliance, the process branches to 136.

Optionally, in case the respective message does not include usable message properties, the local broker 112 may use one or more message properties of one or more previously received messages for the respective message. For example, assuming one or more previously received messages are assigned with a publish timestamp and/or a queuing duration, the local broker 112 may assign the same timestamp and/or the same queuing duration to the respective message.

Naturally only the active (live) local subscriptions should be checked to determine their compliance with the message property(s) since subscription session that have ended should not be served. The local broker 112 may therefore traverse the list of active subscription sessions and check which of the active subscription session is subscribed for the certain topic. For each active (live) local subscription session, the local broker 112 may check compliance of the message properties of the respective message with the session parameters of the respective local subscription session.

For example, assuming a certain non-durable local subscription session was initiated at time M1 and the publish timestamp of the respective message is M2 which is larger (later) than M1, the local broker 112 may determine that the message properties of the respective message comply with the session parameters of the certain non-durable subscription session. In contrast, in case M2 is smaller (earlier) than M1, the local broker 112 may determine that the message properties of the respective message do not comply with the session parameters of the certain non-durable subscription session. In another example, assuming a certain durable local subscription session was initiated at time M3 with a session expiration period of M4. Further assuming the publish timestamp of the respective message is M5. In case M5 is within M3+M4, the local broker 112 may determine that the message properties of the respective message comply with the session parameters of the certain durable subscription session. In contrast, in case M2 is smaller (earlier) than M1, the local broker 112 may determine that the message properties of the respective message do not comply with the session parameters of the certain durable subscription session.

Evidently, the local broker 112 determines the session parameter(s) based on the time domain of the publish-subscribe gateway 102 while the global broker 114 correlates the respective message with message property(s) determined in the time domain of the publish-subscribe broker 104. Therefore, in order to ensure accuracy of the compliance check conducted by the local broker 112 between the message property(s) of the respective message and the session parameter(s) of each active (live) subscription sessions, the local broker 112 must establish a timing reference with the global broker 114. The local broker 112 and the global broker 114 may therefore apply one or more synchronization protocols as known in the art to establish the timing reference with each other. The timing reference established between the local broker 112 and the global broker 114 may include time synchronization but not necessarily. For example, the timing reference may be based on relative timing reference, for example, queueing duration of one or more of the queued and delivered messages.

As shown at 134, the local broker 112 may publish (forward) the respective message to each subscribing client 250 having a live subscription session to the certain topic with session parameter(s) compliant with the message property(s). In particular, the local broker 112 forwards the message to each subscribing client 250 having a compliant subscription session to the certain topic and is currently connected to the publish-subscribe gateway 102. In case a certain subscribing client 250 having a compliant subscription session for the certain topic is currently disconnected from the publish-subscribe gateway 102, the local broker 112 may locally store the respective message, for example, in a buffer, in a queue and/or the like. When the disconnected subscribing client 250 reconnects to the publish-subscribe gateway 102, the local broker 112 may retrieve the stored message and publish (forward) it to the subscribing client 250.

Optionally, the local broker 112 removes one or more of the message properties from the respective message before publishing it to one or more of the subscribing clients 250. In particular, the local broker 112 removes one or more of the message properties which may be inserted in the respective message. Removing the message property(s) from the respective message may ensure compliance of the respective message with the publish-subscribe protocol used by the respective subscribing client(s) 250 to prevent misinterpretation of the respective message by the respective subscribing client(s) 250.

As shown at 136, the local broker 112 does not publish (forward) the respective message to subscribing clients 250 having a live subscription session with session parameter(s) that are incompliant with the message property(s). Naturally, the local broker 112 does not publish the respective message to subscribing clients 250 which do not have a live subscription session to the certain topic.

The local broker 112 may repeat steps 132 through 136 for each of the messages received from the global broker which were published at the global broker during the disconnection period.

It is expected that during the life of a patent maturing from this application many relevant systems, methods and computer programs will be developed and the scope of the terms publish-subscribe service, publish-subscribe protocol and MQTT specification are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of ensuring correctness of sessions of subscribing clients connected to a publish-subscribe broker via a gateway having intermittent connectivity with the broker, comprising:
using at least one processor of the gateway which is intermittently connected to the broker for:
subscribing to at least one topic of a publish-subscribe service controlled by the broker in response to at least one subscription session initiated by at least one subscribing client connected to the gateway for subscribing to the at least one topic;
identifying at least one session parameter indicative of activity state of the subscription session;
reconnecting to the broker following a disconnection period during which the gateway was disconnected from the broker;
receiving from the broker at least one message published on the at least one topic during the disconnection period, the at least one message is correlated by the broker with at least one message property identified by the broker for the at least one message; and publishing the at least one message to the at least one subscribing client based on compliance of the at least one message property with the at least one session parameter.

2. The computer implemented method of claim 1, wherein the at least one session parameter comprising at least one member of a group consisting of: a session durability, a session start time and a session expiration period, the session durability defines whether the subscription session is maintained when the at least one subscribing client is disconnected from the gateway, the session start time indicates the timing of initiation of the subscription session, the session expiration period defines a session preservation time period while the at least one subscribing client is disconnected from the gateway.

3. The computer implemented method of claim 1, wherein the gateway subscribes to the at least one topic in a durable subscription session defining an extended session expiration period.

4. The computer implemented method of claim 1, wherein the at least one message property comprising at least member of a group consisting of: a publish timestamp, a queueing duration, and a queue length, the publish timestamp indicating a publication time of the at least one message on the at least one topic, the queueing duration indicating the amount of time the at least one message was held in a queue of the broker, the queue length indicates the number of messages that were already in the queue when the at least one message was inserted into the queue.

5. The computer implemented method of claim 1, wherein the at least one message property is inserted into the at least one message.

6. The computer implemented method of claim 5, further comprising removing the at least one message property from the at least one message before publishing the at least one message to the at least one subscribing client.

7. The computer implemented method of claim 1, wherein the at least one message property is included in at least one supplemental data element received from the broker in association with the at least one message.

8. The computer implemented method of claim 7, wherein the at least one message is correlated with the at least one message property included in the at least one supplemental data element based on a predefined location of the at least one supplemental data element in a message queue created by the broker for preserving the at least one message for transmission to the gateway.

9. The computer implemented method of claim 7, wherein the at least one message property is correlated in the at least one supplemental data element with an index of the at least one message to associate the at least one message with its at least one message property.

10. The computer implemented method of claim 7, wherein the at least one supplemental data element is published on at least one control topic to which the gateway is subscribed to receive the at least one supplemental data element comprising the at least one message property.

11. The computer implemented method of claim 1, wherein the gateway and the broker apply at least one synchronization protocol to establish a timing reference with each other.

12. The computer implemented method of claim 1, wherein the publish-subscribe service is based on a Message Queue Telemetry Transport (MQTT) protocol.

13. A gateway connecting at least one subscribing client to a broker controlling a publish-subscribe service, comprising:
a program store storing a code; and
at least one processor coupled to the program store and adapted to execute the code, the code comprising:
code instructions to subscribe to at least one topic of a publish-subscribe service controlled by the broker in response to at least one subscription session initiated by at least one subscribing client connected to the gateway for subscribing to the at least one topic,
code instructions to identify at least one session parameter indicative of activity state of the subscription session,
code instructions to reconnect to the broker following a disconnection period during which the gateway was disconnected from the broker,
code instructions to receive from the broker at least one message published on the at least one topic during the disconnection period, the at least one message is correlated by the broker with least one message property identified by the broker for the at least one message, and
code instructions to publish the at least one message to the at least one subscribing client based on compliance of the at least one message property with the at least one session parameter.

14. A computer program product for ensuring correctness of sessions of subscribing clients connected to a publish-subscribe broker via a gateway having intermittent connectivity with the broker, comprising:
a non-transitory computer readable storage medium;
first program instructions for subscribing to at least one topic of a publish-subscribe service controlled by the broker in response to at least one subscription session initiated by at least one subscribing client connected to the gateway for subscribing to the at least one topic;
second program instructions for identifying at least one session parameter indicative of activity state of the subscription session;
third program instructions for reconnecting to the broker following a disconnection period during which the gateway was disconnected from the broker;
fourth program instructions for receiving from the broker at least one message published on the at least one topic during the disconnection period, the at least one message is correlated by the broker with at least one message property identified by the broker for the at least one message; and
fifth program instructions for publishing the at least one message to the at least one subscribing client based on compliance of the at least one message property with the at least one session parameter;
wherein the first, second, third, fourth and fifth program instructions are executed by at least one processor of the gateway from the non-transitory computer readable storage medium.

* * * * *